United States Patent [19]
Thompson, Jr.

[11] 3,723,846
[45] Mar. 27, 1973

[54] HIGH VOLTAGE POWER SUPPLY

[75] Inventor: Chester C. Thompson, Jr., Roslyn Heights, N.Y.

[73] Assignee: Radiation Dynamics, Inc., Westbury, L. I., N.Y.

[22] Filed: Mar. 15, 1972

[21] Appl. No.: 234,748

[52] U.S. Cl. .................321/15, 317/242, 317/244
[51] Int. Cl. ...................................H02m 7/24, H01g
[58] Field of Search ..........34/15; 317/242, 244, 260

[56] References Cited

UNITED STATES PATENTS

| | | | |
|---|---|---|---|
| 2,530,995 | 11/1950 | Rumpf | 317/242 X |
| 3,007,121 | 10/1961 | Schlike | 317/242 X |
| 3,225,258 | 12/1965 | Brekoo et al. | 321/15 |
| 3,246,230 | 4/1966 | Cleland | 321/15 |
| 3,320,513 | 5/1967 | Cleland | 321/15 |
| 3,589,003 | 6/1971 | Kastner | 321/15 |

Primary Examiner—William H. Beha, Jr.
Attorney—Howard L. Rose et al.

[57] ABSTRACT

A power supply for high voltage accelerators employs a plurality of elongated cylindrical capacitors, disposed circumferentially about a plurality of centrally located solid state rectifiers. The plates of each capacitor comprise inner and outer coaxial sleeves located in a gaseous atmosphere with A.C. applied to the inner sleeves to provide large effective spacing between the A.C. driven sleeves of the capacitors, the inner sleeves being shielded from one another by the outer sleeves. Solid state rectifiers require lower driving frequencies than are normal in such supplies. Output voltage loss resulting from use of lower frequencies is compensated by the large capacitance achieved and the use of a lesser number of rectifier stages. Peak inverse voltage limitations of the rectifiers are met by cascading rectifiers per stage, the large central space provided by the capacitor structure providing the space necessary for cascading.

10 Claims, 10 Drawing Figures

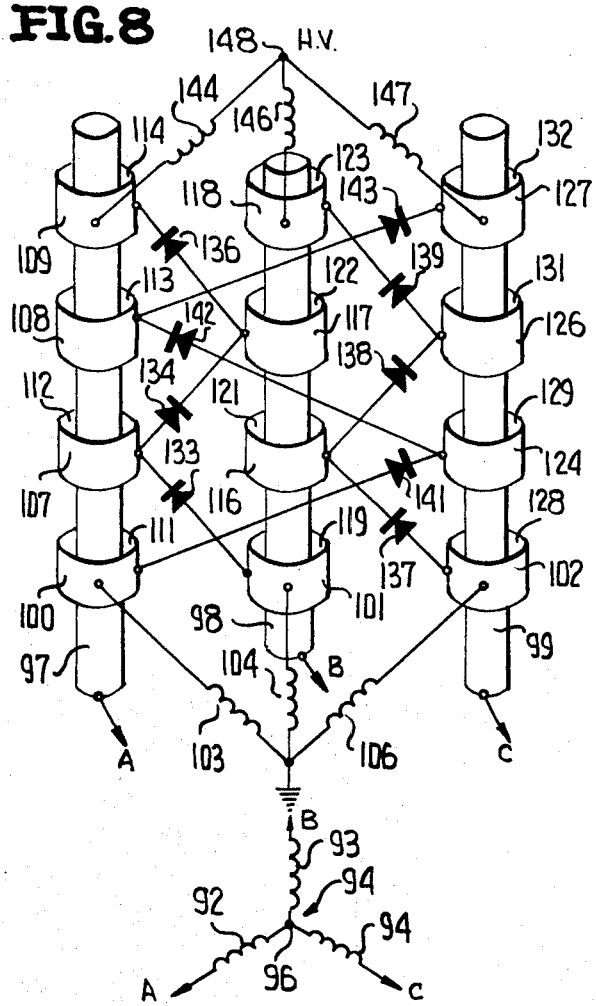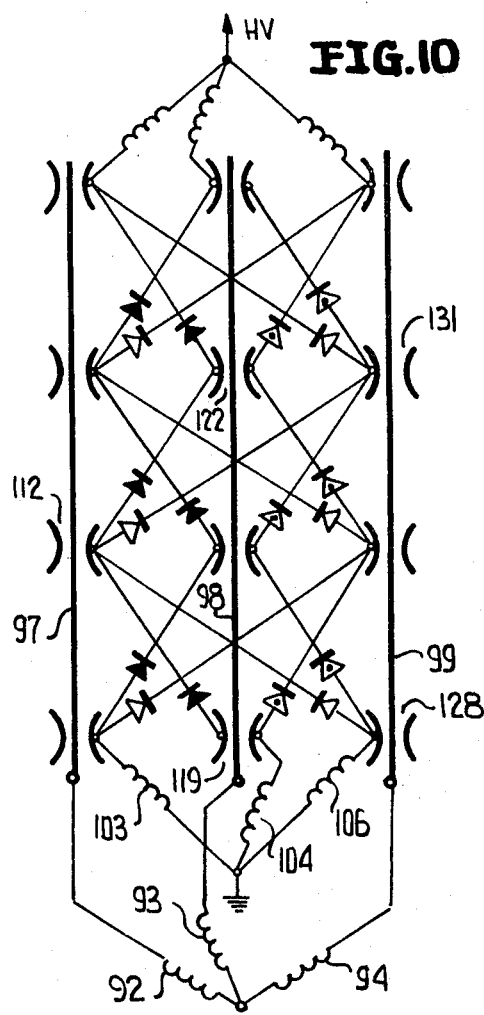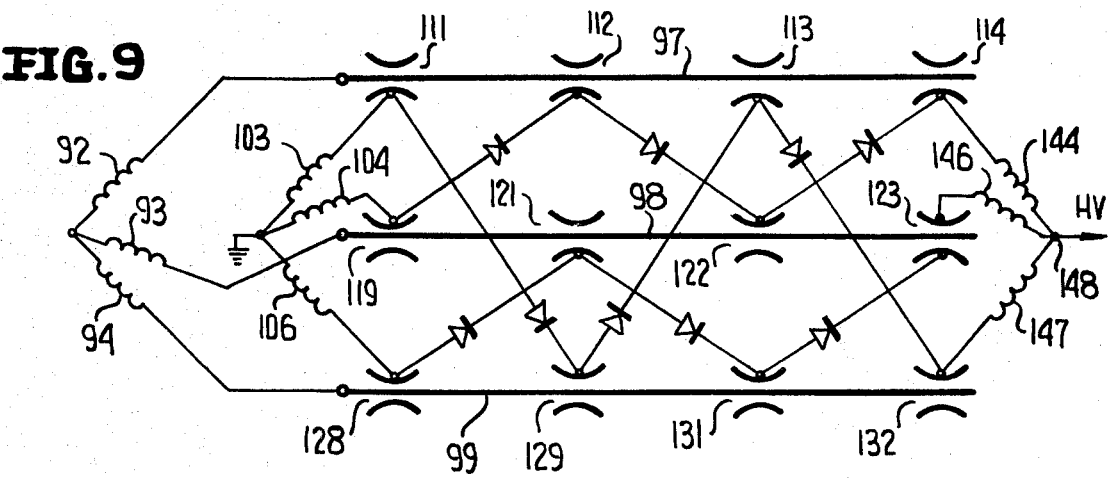

HIGH VOLTAGE POWER SUPPLY

BACKGROUND OF THE INVENTION

The present invention relates to power supplies primarily intended for use with high voltage accelerators and more particularly to power supplies employing solid state rectifiers and designed for voltages of 4,000,000 or more volts and electron beam currents up to 250 or more milliamps.

The use of high voltage electron and ion beam accelerators has until quite recently been confined primarily to the research market which employed high voltage, low-current machines. The industrial market for electron and ion accelerators which is now emerging has quite different requirements. Large beam currents are of primary importance in such machines while lower voltages may be tolerated and in fact are encouraged if for no other reason than to reduce radiation shielding costs. The commercial market also requires smaller machines because of space problems along production lines and machines having a considerably lower failure rate than can be tolerated in a research machine.

A typical research machine with which the present inventor is familiar forms the subject matter of U.S. Pat. No. 2,875,394 to Marshall R. Cleland and assigned to the same assignee as the present application. In this machine, the accelerator tube is located along the center of the machine and the power supply is concentric therewith and is almost as long as the tube. Such an arrangement is not well adapted for use in many industrial applications due to the bulk of the machine.

In the patent, Cleland suggests an arrangement in which the tube is not located centrally of the power supply; the arrangement being illustrated in FIG. 9 of the patent. The structure of the apparatus of FIG. 9 employs a plurality of axially aligned capacitors each having inner and outer coaxial hollow metallic cylinders with the rectifiers disposed along the axis of and located between the capacitors. Alternating voltages of opposite phase are applied to adjacent outer cylinders. The rectifiers are connected to the inner cylinders.

One difficulty with such an arrangement resides in the fact that unless certain specific measures are taken cross talk exists between adjacent inner cylinders. Specifically since the outer cylinders of adjacent capacitors are connected to opposite phases of the A.C. supply, the inner cylinders are of opposite polarity and a strong electrostatic field is developed between the ends of these inner cylinders. As a result of these effects the outer cylinders do not properly couple to the inner cylinders at the end regions with a resultant loss in capacity and therefore loss of D.C. output voltage of the supply relative to the A.C. input voltage.

Another problem encountered in prior art machines in general is that they employ vacuum or gas tube rectifiers which in industrial applications often are responsible for failure rates which although completely acceptable for research machines are marginal for industrial machines which are typically on line for many hours each day.

It is an object of the present invention to provide a power supply useful for high voltage accelerators which employs solid state rectifiers to insure a large mean time between failures.

It is another object of the present invention to provide a power supply having a capacitor arrangement providing large capacity per stage and in which the capacitors are arranged such as to substantially eliminate cross-talk and end effects between capacitors.

Yet another object of the present invention is to provide a capacitor arrangement for D.C. high voltage power supplies such as to provide a large central region for the power supply rectifiers whereby to eliminate crowding of the rectifiers and consequent rectifier overheating.

Still another object of the present invention is to provide a capacitor structure for D.C. high voltage power supplies in which the A.C. input is shielded by the outer sleeves of the capacitors which operate at direct voltages.

In accordance with the present invention, solid state rectifiers are employed in a D.C. high voltage power supply to increase the mean time between failures of the supply. The difficulty with employing solid state as opposed to gas filled or vacuum rectifiers is that the cost becomes prohibitive in the environment of the Cleland invention which operates at frequencies of the order of 80 to 300 kilohertz. Operation at frequencies which are economically feasible for solid state rectifiers, 5 to 50 KHz, is rendered practical in accordance with the present invention as a result of the capacitor electrode configuration set forth hereinbelow which provides the necessary capacity to compensate for output voltage vs. input voltage loss resulting from use of lower frequencies.

The equation defining the relationship between a.c. input voltage and D.C. output voltage in supplies of the type under consideration is:

$$E_{OUT} = NE_{IN} - (NI/fC)$$

where $N$ is the number of rectifier stages and $C$ is the coupling capacitance per stage. It is apparent that if the frequency ($f$) of the input a.c. voltage is decreased by, for instance, a factor of 8, the second term of the equation is increased by a factor of 8, and the output voltage $E_{(OUT)}$ is materially reduced. Since it is undesirable to reduce the current output of the machine, $I$ in the above equation, the only factors that can be varied are the number of rectifier stages and the coupling capacitance per stage.

In accordance with the present invention, the effect of the reduced frequency on the output is compensated by providing a capacitor structure producing a large effective capacity, a capacity of two or more times that provided by the structures disclosed in the Cleland patent. If, for instance, the capacity is increased by a factor of 2 then, a reduction by one eighth of the frequency only increases the second term of the above equation by a factor of 4.

Additional low frequency compensation is provided in accordance with a further feature of the present invention by decreasing the number of rectifier stages. A decrease in the number of rectifier stages tends to compensate for the reduction in frequency as can be seen in the second term of the above equation. In addition the reduction in number of stages allows the use of unit capacitors of greater length thus further compensating for the reduction in frequency. This however does require an increase in the AC input voltage $E_{IN}$ in order to maintain the first term of the equation at its original value.

Another advantage flowing from decreasing the number of stages is that the number of rectifier junctions that can be physically included in each rectifier stage can be increased. As a result the peak inverse voltage, which is a fixed factor for any given machine, that must be sustained by each rectifier junction, is reduced. Thus if a single rectifier junction is employed per stage then the rectified devices employed must be designed to accommodate the maximum machine transient, perhaps one million volts. If the number of rectifier junctions per stage is increased to, for instance, to four then the peak inverse voltage that must be accommodated by each rectifier junction is only 250 thousand volts.

The capacitor and overall supply structure also contribute to the ability of the supply of the present invention to establish peak inverse voltages across each pair of rectifier junctions sufficiently low to provide relatively trouble free operation of the supply. Specifically, the capacitor structure required to supply the requisite capacitance is sufficiently small to permit the use of a relatively large number of rectifier junctions per stage this maintaining the peak inverse voltage per junction at levels well within design tolerances.

In one embodiment of the present invention, an outer cylindrical vessel is provided as the container for the supply. The supply is arranged in the vessel and comprises a step-up transformer, the primary of which is energized by an external A.C. source operating at a frequency of up to 50 KHz.

The capacitors of the supply comprise, in one embodiment, four pairs of coaxial hollow metallic tubes with each capacitor arranged in a different quadrant of the cylinder and extending axially of the housing. The center tube of each capacitor is continuous, opposed ones of said four tubes being connected together and the pairs thus formed being connected to opposite ends of the transformer secondary. The transformer is center-tapped and grounded and a string of solid state rectifiers is connected between said center tap and the high voltage output terminal of the supply. The rectifiers are mounted in an axially extending central region of the housing circumscribed by the outer cylinders of the capacitors.

The outer cylinders of the capacitors are discontinuous, there being one such discrete cylinder section for each rectifier stage of the supply. Each such cylinder is connected between the end and beginning rectifiers of two adjacent stages with the junctions connected in alternation to the outer cylinders of different capacitor pairs. The rectifiers and outer cylinders are arranged such that rectifiers do not subsist adjacent the discontinuities between outer cylinders of the capacitors. Thus voltage stresses between the outer cylinders do not intercept the rectifiers and impose additional effective inverse voltages thereacross.

In the above embodiment, since the inner cylinders of each capacitor are continuous and since the outer electrodes disposed about a common inner electrode are all of the same phase, the problems encountered with A.C. edge effects described above are eliminated. Further, due to the spacing available between the capacitors, a large central core is provided for mounting the rectifiers so that heat dissipation is facilitated and a sufficient number of rectifier junctions per stage may be employed to provide a peak inverse voltage per rectifier that is well within the tolerances permitted with commercially available solid state devices.

In the first embodiment of the invention described above, the power supply actually constitutes two serial supplies in parallel providing twice the current, available from the unit if the supply is connected as a series supply only. Various connections and arrangements of the capacitors and rectifiers may be employed. For instance, half and full wave voltage doubler operation may be provided. Further three and four phase inputs may be employed to provide smoother D.C. voltages than can be obtained with a single phase supply. In the case of a three phase device only three capacitor columns are employed which obviously can be larger in diameter and therefore capacity than in the four capacitor column system.

It is yet another object of the present invention to provide a power supply employing a basic design approach which is susceptible of operation as a full or half wave supply with voltage doubling action and which may be operated with single or multiple phase inputs.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 8 is a mechanical schematic diagram of a three phase, half wave, voltage doubler supply of the present invention;

FIG. 9 is an electrical schematic diagram of the supply of FIG. 8; and

FIG. 10 is an electrical schematic diagram of a three phase, full wave, voltage doubler supply employing the mechanical structure of the present invention.

DESCRIPTION OF THE PREFERRED EMBODIMENTS

Figure 1:
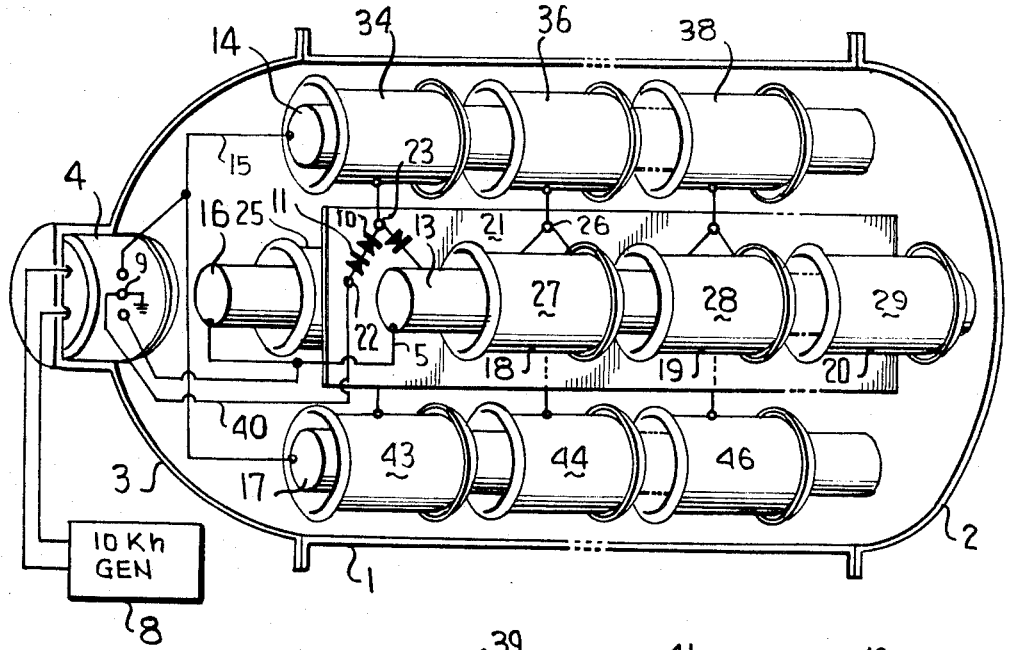
FIG. 1 is a view in perspective of the apparatus of a first embodiment of the present invention constituting a serio-parallel power supply.
Figure 2:
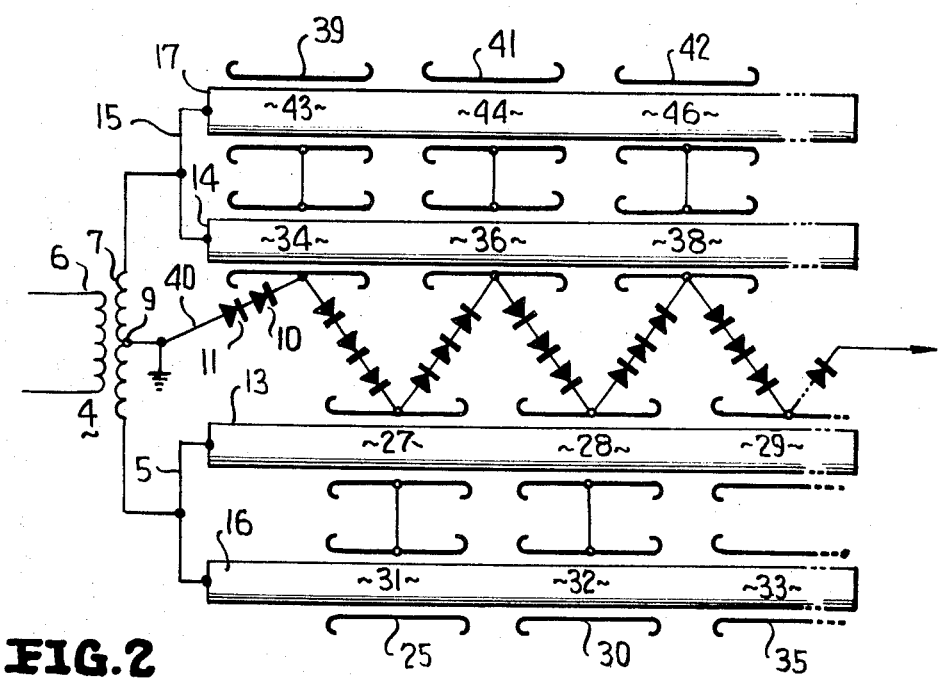
FIG. 2 is a mechanical schematic view of the embodiment of FIG. 1.
Figure 3:
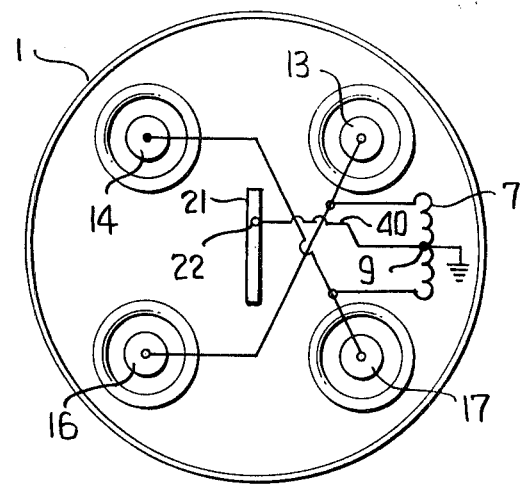
FIG. 3 is an end view of the apparatus of FIG. 1.

Referring now specifically to FIGS. 1 through 3 of the accompanying drawings, a metallic, hollow, cylindrical, gas-tight, pressure vessel is designated by the reference numeral 1. The vessel may include a pair of end enclosures 2 and 3 which may be suitably secured as if by bolting to the cylindrical vessel 1. Enclosed within the vessel are a transformer 4 and a plurality of capacitors and solid state rectifiers forming the power supply of the present invention. The transformer 4 comprises a primary winding 6 and a secondary winding 7; the primary winding being connected, for instance, to an external 10 kHz generator designated by the reference numeral 8. The secondary winding 7 has a grounded center tap generally designated by the reference numeral 9 connected via a lead 40 to a terminal 22 on a circuit board 21. Terminal 22 of the circuit board 21 is grounded and is connected to a terminal 23 of the circuit board via a pair of series connected solid state rectifiers 11 and 10 with the positive terminal of the solid state rectifier 11 being connected to the terminal 22 and the negative terminal of the rectifier 10 being connected to terminal 23. Alternatively the rectifiers 11 and 10 may be omitted and a choke employed instead to provide smoothing.

The capacitors, in accordance with the present invention, include in this embodiment, four axially-elongated, hollow, metallic cylinders 13, 14, 16 and 17 each located in a different quadrant of the vessel 1. Disposed about each of the elongated cylinders are a plurality of hollow, cylindrical sleeves such as 18 and 19 which are two of the sleeves disposed about elongated cylinder 13. The cylinders 13, 14, 16 and 17 extend substantially throughout the length of the vessel 1 and constitute one plate of each of a plurality of capacitors of the apparatus. The cylinders 13 and 16 are electrically connected together via lead 5 as are the cylinders 14 and 17 via lead 15. The cylinders 13 and 16 are connected to one end of the secondary winding 7 and the cylinders 14 and 17 are connected to the other end of the secondary winding 7.

Figure 4:
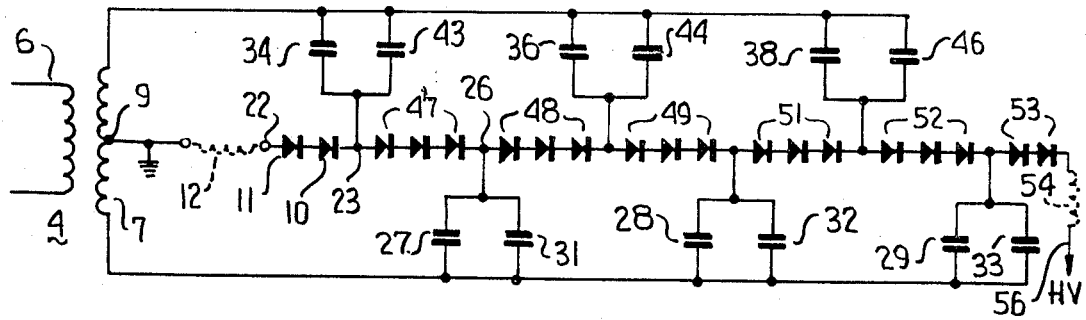
FIG. 4 is an electrical schematic diagram of the half-wave, voltage doubler apparatus of FIGS. 1-3.

The sleeves 18, 19 and 20 are axially aligned along the cylinder 13 and comprise in conjunction therewith a plurality of capacitors 27, 28 and 29. Although only three such sleeves are illustrated the number of sleeves disposed about each of the hollow cylinders is determined by the number of rectifier stages and/or capacitance necessary to provide the voltage and/or current for which the machine is designed. The cylinder 16 has associated therewith the sleeves 25, 30 and 35 comprising capacitors 31, 32 and 33, respectively. The cylinder 14 is provided with a plurality of axially-aligned, metallic sleeves comprising with the center cylinder 14 capacitors 34, 36 and 38, while the elongated cylinder 17 has associated therewith the sleeves 39, 41 and 42 comprising therewith capacitors 43, 44 and 46. Referring specifically to FIG. 4, the terminal 23 is connected through a plurality of solid state rectifiers generally designated by the reference numeral 47 to terminal 26 which is connected to the sleeve 18 associated with the cylinder 13 to define a capacitor 27.

The number of rectifier junctions connected between any two of the circuit board terminals constitute a rectifier stage and may comprise any number which is suitable to tolerate the peak or transient inverse voltage per stage. In the initial stage as illustrated in the drawings, two such rectifier junctions 11 and 10 are employed and in the subsequent stages, except the final stage, three such rectifier junctions are illustrated, the final stage employing only two rectifier junctions since it is subjected to only half of the voltage across the transformer.

The electrical circuit of the arrangement illustrated in FIGS. 1–3 is illustrated in FIG. 4. In the embodiment illustrated in FIG. 4 five complete rectifier stages are illustrated and are designated by reference numerals 47, 48, 49, 51 and 52. An initial rectifier stage comprising rectifier junctions 11 and 10 and a final rectifier stage 53 comprising only two rectifier junctions are also provided to complete the circuit.

In operation, if the upper end of the transformer secondary winding 7 as illustrated in FIG. 4 is positive relative to the center tap 9, then capacitors 34, 43, 36, 44, 38, 46 are charged through the various rectifier stages. When the lower end of the transformer secondary 7 becomes positive relative to the center tap, the capacitors 27 and 31, 28 and 32, and 29 and 33 are charged. The choke 12 and another choke 54 between the rectifier stage 53 and high voltage output terminal 56 may be employed rather than rectifiers to smooth the D.C. voltage. The chokes and half rectifier stages normally should be used alternatively and not together since both are not required in the same device and this statement holds for all the embodiments of the present invention. The rectifier arrangement provides higher voltage and the choke arrangement provides better filtering i.e., smoothing. If desired, of course, both may be employed concurrently.

It will be noted that each of the stages charges two capacitors in parallel, in the case of the first stage the capacitors 34 and 43. Thus there is provided a large capacity per stage. The large capacity per stage is due not only to the use of parallel capacitors, but also due to the specific arrangement of capacitors which provides a large capacity relative to the space available.

As to the physical construction of the supply there are several important features. It will be noted that the cylinders 13, 14, 16 and 17 of each of the capacitors carry the A.C. voltage. These cylinders are well isolated from one another due to their spacing and the isolating effect provided by the outer sleeves. Also there is no discontinuity in any of the individual cylinders so that the end effects which are so objectionable in the prior devices are eliminated. As to the outer cylinders, for instance, cylinders 18 and 19, their length is as great as can be permitted by the voltage stresses between stages so as to provide maximum shielding of the cylinders. The spacing between the sleeves however must be such that undue D.C. voltage stresses are not set up between the stages. To minimize this spacing the opposed ends of the cylinders are rounded so that no regions of extreme voltage stress are established. It should be noted that the sleeves are in phase relative to the A.C. voltage and no A.C. stress appears between adjacent sleeves.

The arrangement of the rectifiers is such that no rectifier is located close to a region between adjacent sleeves, such as 18 and 19, so that the local voltage stresses per stage which are produced due to the D.C. voltage difference between the adjacent cylinders does not have a great effect upon the rectifiers and therefore does not increase the effective peak inverse voltage across the various rectifier stages or rectifier junctions.

The large central region defined between the capacitor structures provides ample space to mount and cool if necessary, the individual rectifiers so that difficulties due to heating are not appreciable. The vessel may be pressurized with a gas having high dielectric strength such as sulfur hexachloride ($SF_6$). The pressurization of the vessel assists in dissipating the heat from the rectifiers and therefore reduces the problem of heat failures in the solid state devices.

As previously indicated, the primary concern of the present invention is to reduce the overall size of power supplies which have previously been available and to be able to utilize solid state devices to reduce the failure rate inherent with vacuum or gas filled rectifier tubes. Also as previously indicated, in order to better utilize solid state devices the frequency of the device must be reduced relative to the frequency previously employed in such devices. However the reduction in frequency reduces the output voltage in direct proportion to the reduction in frequency.

The present invention overcomes the problem of reduction in output voltage by increasing the capacity available by the utilization of the specific capacitor design set forth herein and by reducing the number of stages which also has a direct effect on the output voltage. In order to be able to accommodate the peak or transient inverse voltage, a number of rectifier junctions must be utilized per stage which number may be larger than the number of rectifier junctions utilized per stage in more conventional designs. However, due to the large central space defined by the particular capacitor structure utilized and the fact that solid state rectifiers are smaller than their gas filled or vacuum counterparts a large number of rectifier junctions may be located in the central space and therefore a large number of rectifier junctions per stage may be utilized. Further extreme field effects are reduced due to the design of the capacitors. The cylindrical configuration of the capacitors relative to the prior art are considerably cheaper due to the fact that rather complex capacitor plate configurations are not required in order to maintain the voltage stresses per stage at acceptable levels.

The capacitor structure disclosed normally will be a gas-filled capacitor. Basically the plates are spaced as illustrated and the entire vessel is filled with an insulating gas such as $SF_6$ under pressure. Such capacitors have the advantage of being self healing, i.e. if arcing occurs, the arc is discontinued upon discharge of the capacitor with phase reversal of the alternating current and no residual effects are suffered. The current (I) capacity of the machine can be increased by employing capacitors having solid dielectrics. In such case however if arcing occurs across a capacitor it will be destroyed and require replacement. To a certain extent this problem can be alleviated by terminating the solid dielectric inwardly of one end of each capacitor so that arcing if it occurs will in all probability occur in the region of the gas dielectric which has a lower dielectric strength than the solid dielectric.

Figure 5:
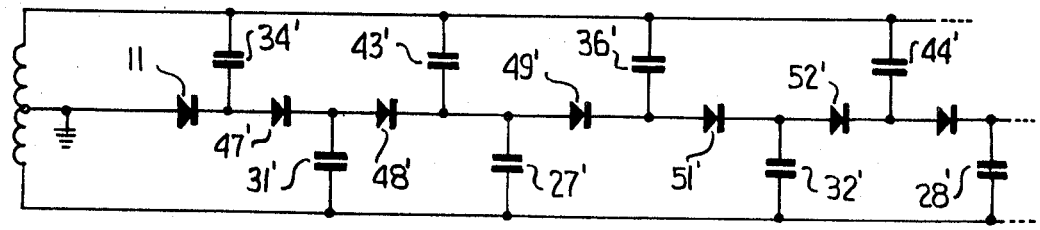
FIG. 5 is an electrical schematic diagram of a serial half-wave, voltage doubler power supply.
Figure 6:
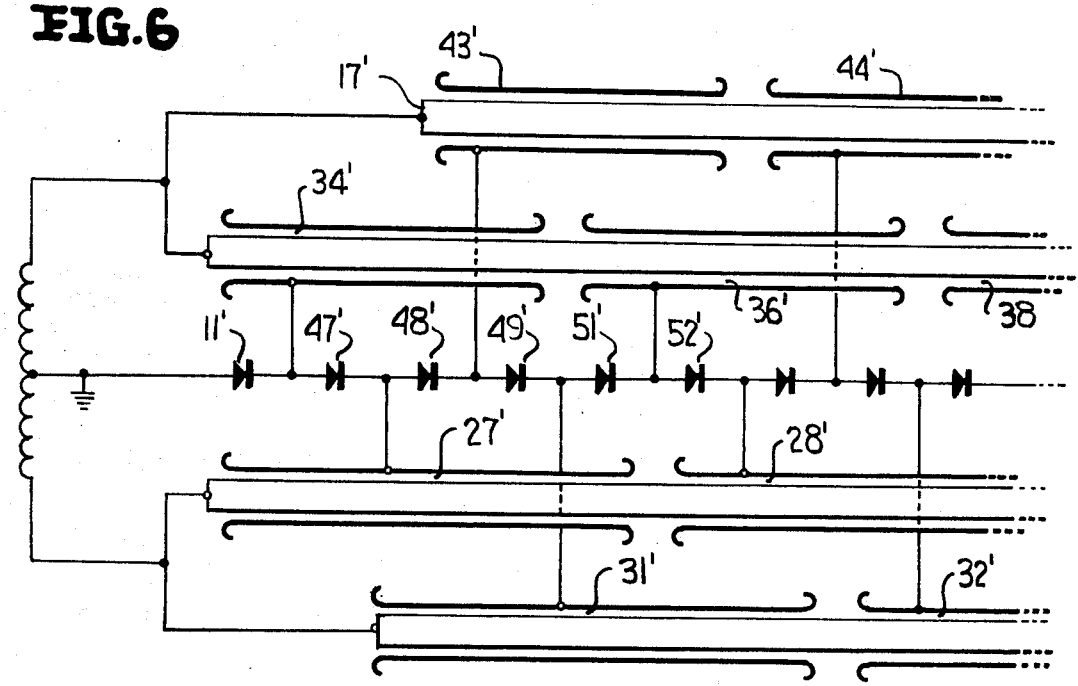
FIG. 6 is a mechanical schematic diagram of the power supply of FIG. 5.

The first embodiment of the present invention utilizes four capacitor groupings with opposed capacitor groupings connected in parallel. This is not essential to the operation of the device but is utilized in order to obtain high current output. In accordance with a second embodiment of the present invention which is illustrated in FIGS. 5 and 6 of the accompanying drawings, a higher voltage, lower current machine is provided by connecting all of the capacitors and associated rectifier stages in series rather than in the serio-parallel arrangement of the first embodiment. In the arrangement of FIGS. 5 and 6, the individual capacitors are charged each through a different rectifier stage and the capacitors therefore are not connected in parallel as in the embodiment of FIGS. 1 through 4. The number of stages is thus increased by a factor of 2 but the capacitance per stage is reduced by a factor of 2. This results in twice the output voltage and half the output current capability compared to the first embodiment. The original current capability can be preserved at the higher output voltage by doubling the length of the individual capacitors and consequently the total length of the system.

Figure 7:
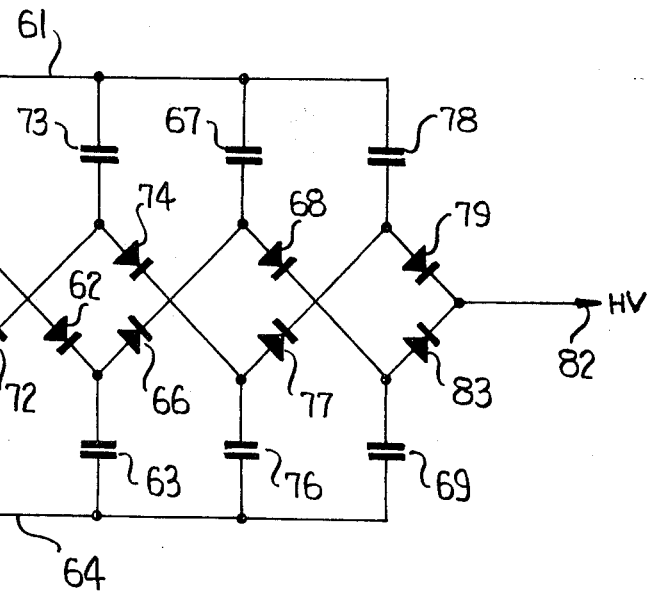
FIG. 7 is an electrical schematic diagram of a single phase, full wave, voltage doubler supply employing the apparatus of FIG. 1.

In still another embodiment of the present invention the capacitors and rectifiers are interconnected such as to provide two half-wave, voltage-doubler circuits in parallel. Referring specifically to FIG. 7, the primary winding 7 of the input transformer again has its center tap 9 connected to ground and is connected to a junction of rectifiers 57 and 58. A.C. leads 61 and 64 are connected to the upper and lower terminals as viewed in FIG. 7 of the transformer secondary winding 7, the leads 61 and 64 being connected to cylinders 13 and 16 and 14 and 17 respectively. The junction of the rectifier 57 and capacitor 59 is connected through a rectifier 62 and thence via a capacitor 63 to the A.C. lead 64. The junction of rectifier 62 and capacitor 63 is connected through a further rectifier 66 and thence via a capacitor 67 to the lead 61 and via a further rectifier 68 and thence through a capacitor 69 to the lead 64. Rectifier 58 is connected through a capacitor 71 to the lead 64 and also through a rectifier 72 to a junction of capacitor 73 and rectifier 74. Capacitor 73 is connected between the aforesaid junction and the lead 61. The junction is connected via rectifier 74 and the capacitor 76 to the lead 64 and the rectifier is also connected to the junction of a capacitor 78 and rectifier 79 via rectifier 77. The last mentioned junction is connected through the capacitor 78 to the lead 61 and via rectifier 79 to a high voltage terminal 82. The junction of the rectifier 68 and capacitor 69 is connected via rectifier 83 to terminal 82.

The specific circuits of the present invention as previously indicated, are half wave, voltage doubler circuits, the voltage doubler operation raising the voltage above that which would otherwise be provided in the more conventional prior art rectifier circuits. In FIG. 7 two such circuits are connected in parallel to provide a desired level of current. The apparatus of FIG. 7 uses the same basic physical structure as illustrated in FIG. 1 but the interconnection of the various rectifiers and capacitors is different from that illustrated in the previous figures.

The voltage doubler action of the supply of FIG. 7, and in the prior embodiments also, results from the fact that for instance when the line 61 is positive the capacitors 59, 73, 67, 78, etc. are charged. When the line 64 goes positive the charge accumulated in the aforesaid capacitors is applied to the capacitors 63, 76, 69, etc. along with the charge due to the actual voltage swing between the lines 64 and 61. Thus a doubler action results.

The various embodiments of the present invention thus far described utilize four capacitors arranged in different quadrants of the vessel 1. There is no necessity that four capacitors be utilized and other arrangements may be employed. For instance, two large capacitors may be utilized with various rectifier stages arranged in the spaces in opposed quadrants where the capacitors in the four capacitor unit would normally be situate. In such an arrangement the capacitors may be larger than in the case where four capacitors are utilized, but not so large that the outer sleeves approach one another to a distance sufficient to produce breakdown between the various outer sleeves of the different stages.

If it is necessary to provide a D.C. voltage having low ripple, power supplies may be provided, according to the present invention, utilizing more than two phase alternating current sources. Three and four phase supplies are readily available each providing an increasingly smooth D.C. output voltage. Specific advantages accrue in other aspects of the supply when a three phase voltage source is utilized. Specifically only three capacitors are required and they may be of such a size as to provide large coupling capacitance while permitting maintenance of a large central region for mounting of the rectifiers. Such a system is illustrated in FIGS. 8 and 9 of the accompanying drawings, reference now being made to these Figures.

The apparatus is provided with a three phase input transformer having three single phase secondary windings 92, 93 and 94 each carrying a different phase of the three phase input supply. The windings are connected together at a center point generally designated by the reference numeral 96 and the outer legs of the three windings are connected to hollow elongated metallic cylinders 97, 98 and 99 respectively. The cylinders extend approximately the length of the supply and correspond in their functions to the cylinders 13, 14, 16 and 17 of FIG. 1. The cylinder 97 has a sleeve 100 disposed about its end adjacent to the winding 92. The sleeve 100 together with the cylinder 97 forms a capacitor 111 in the same manner as in the prior embodiments. The cylinder 98 has a first sleeve 101 and the cylinder 99 has a first sleeve 102. The sleeves 100, 101 and 102 are connected to ground through respective filtering chokes 103, 104 and 106. The cylinder 97 has disposed thereabout a further plurality of axially spaced sleeves, three additional such sleeves being illustrated in the drawing and being designated by reference numerals 107, 108 and 109 which together with the sleeve 100 define four capacitors designated respectively by the reference numerals 111, 112, 113 and 114. Similarly the cylinder 98 has additional coaxial sleeves disposed thereabout and designated by the reference numerals 116, 117 and 118 defining the capacitors with the cylinder 98 which are designated respectively by the reference numerals 119, 121, 122 and 123. The cylinder 99 has associated therewith additional coaxial sleeves 124, 126 and 127 which define with the cylinder 99 and the first sleeve 102, the capacitors 128, 129, 131 and 132.

A rectifier 133 is connected between sleeves 101 and 107 and rectifiers 134 and 136 are connected between sleeves 107 and 117 and 117 and 109 respectively. Additional rectifiers are connected as follows: Rectifier 137 between sleeves 102 and 116; rectifier 138 between sleeves 116 and 126; and rectifier 139 between the sleeves 126 and 118. Additional rectifiers 141, 142 and 143 are connected respectively between the sleeve pairs 100 and 124, 124 and 108 and 108 and 127. The sleeves 109, 118 and 127 are connected through individual different chokes 144, 146 and 147 respectively to a high voltage terminal 148. The various rectifiers are actually pluralities of rectifiers as previously described.

The supply just described comprises a three-phase, half-wave voltage-doubler circuit and reference is now made to FIG. 9 for a description of operation of the circuit. In describing such operation it is assumed that the windings 92–93 have the zero phase (phase AB), the windings 93–94 have the 120° phase (phase BC), the windings 94–92 have the 270° phase (phase AC) of the three phase supply developed thereacross and thus across the corresponding cylinders. Initially assume phase AC is positive relative to phases CB and BA. As a result capacitors 111, 129, 113 and 132 are charged. When the phases reverse, the capacitor 129 discharges into capacitor 113 and the capacitor 132 discharges to the high voltage terminal thus producing the voltage doubling action. When the phase AB is positive relative to the phases BC and CA, the capacitors 119 and 112 are charged through rectifier 133 and capacitors 122 and 114 are charged through rectifier 136. On the reversal of the phase the capacitor 112 discharges into capacitor 122 and 114 discharges to the high voltage terminal 148 through choke 144. A similar analysis applies for each phase being positive relative to the others. The voltage doubler action as previously indicated occurs because a capacitor charged during one phase of the cycle is discharged into the next capacitor during the opposite phase. Half wave operation results since discharge to the high voltage terminal occurs from each end capacitor only when that capacitor is positive or more particularly its cylinder is positive relative to the high voltage terminal.

A three phase full wave voltage doubler supply is illustrated in FIG. 10 of the accompanying drawings. In this arrangement it will be noted that each capacitor is connected through a diode to the capacitor of the next stage of each of the other sleeves and in turn is charged through a rectifier from each capacitor of the preceding stage of the supply. Thus each capacitor is charged during each half cycle of its phase rather than during each full cycle as in the apparatus of FIGS. 10 and 11. For example, refer to the capacitor 112 associated with the cylinder 97. It is connected via a diode from both the capacitors 119 and 128 associated with the cylinders 98 and 99 whereas in the apparatus of FIG. 8, the capacitor 112 is only charged from the capacitor 119. This in effect causes the capacitors, for instance 112, 119, 122 and 128 and 131 all to be charged in this string when the winding 93 is positive relative to windings 92 and 94. Thus all the capacitors in this Figure are charged each half cycle whereas in FIG. 8 they are charged each full cycle.

While I have described and illustrated specific embodiments of my invention, it will be clear that variations of the details of construction which are specifically illustrated and described may be resorted to without departing from the true spirit and scope of the invention as defined in the appended claims.

We claim:

1. A capacitor structure for a power supply comprising a plurality of elongated conductive cylinders,
a plurality of groups of hollow conductive sleeves,
each said group of sleeves being associated with a different one of said cylinders,
the sleeves of each said group being coaxial with its associated cylinder and spaced along the axis thereof at distances from each other such as to prevent voltage breakdown between adjacent ones of said sleeves.

2. The invention according to claim 1 wherein said cylinders are hollow.

3. The invention according to claim 1 wherein said cylinders are generally parallel to one another.

4. The invention according to claim 1 wherein the ends of said sleeves are rounded.

5. The invention according to claim 2 wherein there are four of said cylinders,
said cylinders being arrayed at the four corners of a generally square configuration.

6. The invention according to claim 2 wherein there are three of said cylinders,
said cylinders being arrayed at the corners of a generally equilateral triangle.

7. A power supply comprising:
a plurality of elongated conductive cylinders,
a plurality of groups of hollow conductive sleeves,
each said group of sleeves being associated with a different one of said cylinders,
the sleeves of each said group being coaxial with its associated cylinder and spaced along the axis thereof at distances from each other such as to prevent voltage breakdown between adjacent ones of said sleeves,
means for applying opposite polarities of an alternating voltage to various of said cylinders,
and rectifiers connected between sleeves of said cylinders having opposite polarities of the A.C. applied thereto.

8. The invention according to claim 7 wherein said cylinders are generally parallel to one another and are spaced from one another such as to define a central space therebetween and means for supporting said rectifiers in said central space.

9. The invention according to claim 8 wherein said rectifiers are located remote from the spaces between said sleeves.

10. The invention according to claim 7 wherein said rectifiers are solid state devices,
said means for applying comprises a source of alternating voltage having a frequency approximately equal to a maximum of 10Kh, and
wherein said rectifiers comprise a plurality of rectifiers connected between each of two of said sleeves.

* * * * *